US009610805B2

(12) United States Patent
van den Berg et al.

(10) Patent No.: US 9,610,805 B2
(45) Date of Patent: Apr. 4, 2017

(54) HUB SYSTEM AND VEHICLE

(71) Applicant: Berg Toys Beheer B.V., Ede (NL)

(72) Inventors: Hendrik van den Berg, Ede (NL);
Peter Edwin Andeweg, Ede (NL);
Thijs Mattheus Johannes Marie van Dooren, Ede (NL); Wessel Anton Caspar Akveld, Ede (NL)

(73) Assignee: Berg Toys Beheer B.V., WB Ede (NL)

( * ) Notice: Subject to any disclaimer, the term of this patent is extended or adjusted under 35 U.S.C. 154(b) by 0 days.

(21) Appl. No.: 14/615,980

(22) Filed: Feb. 6, 2015

(65) Prior Publication Data
US 2015/0224824 A1 Aug. 13, 2015

(30) Foreign Application Priority Data

Feb. 11, 2014 (NL) ...................................... 2012240

(51) Int. Cl.
| | |
|---|---|
| *F16D 13/26* | (2006.01) |
| *F16D 41/24* | (2006.01) |
| *F16D 67/02* | (2006.01) |
| *B62L 5/02* | (2006.01) |
| *B60B 35/12* | (2006.01) |
| *B62K 5/02* | (2013.01) |
| *B62K 9/02* | (2006.01) |

(Continued)

(52) U.S. Cl.
CPC ................ *B60B 35/12* (2013.01); *B62L 5/02* (2013.01); *F16D 13/26* (2013.01); *F16D 41/24* (2013.01); *F16D 67/02* (2013.01); *B62K 5/02* (2013.01); *B62M 9/02* (2013.01); *F16D 2023/123* (2013.01)

(58) Field of Classification Search
CPC . F16D 41/24; F16D 13/26; B62L 5/02; B62L 5/08; B62K 5/02
See application file for complete search history.

(56) References Cited

U.S. PATENT DOCUMENTS

| | | | | | |
|---|---|---|---|---|---|
| 2,572,182 | A | * | 10/1951 | Mueller .................... | B62L 5/08 12/146 D |
| 2,613,763 | A | * | 10/1952 | Campbell ................. | B62L 5/08 188/26 |

(Continued)

FOREIGN PATENT DOCUMENTS

JP          EP 1700780 A1 *   9/2006  ............ B62M 11/18

*Primary Examiner* — Jacob S Scott
*Assistant Examiner* — Tinh Dang
(74) *Attorney, Agent, or Firm* — Schwegman Lundberg & Woessner, P.A.

(57) ABSTRACT

A hub system includes a hub shaft; a driving member and a hub shell mounted with respect to the hub shaft. A brake shoe is arranged for engaging the hub shell to temporarily be coupled with said hub shell and a brake anchor is arranged to be attached to a frame and a coupling element is arranged for enabling coupling between the driving member and the hub shell in a first position, and for enabling coupling between the brake anchor and the hub shell in a second position. The hub shaft is rotationally coupled to the brake shoe in one rotational direction at a first location located at a first lateral side of the driving member, and to the brake anchor in one rotational direction at a second location located at a second lateral side of the driving member and opposite of the first lateral side of said driving member.

20 Claims, 4 Drawing Sheets

(51) Int. Cl.
    *B62M 9/02*          (2006.01)
    *F16D 23/12*       (2006.01)

(56) References Cited

U.S. PATENT DOCUMENTS

| | | | | |
|---|---|---|---|---|
| 4,727,965 A | * | 3/1988 | Zach | A61G 5/02 192/217.4 |
| 5,938,560 A | * | 8/1999 | Steuer | B62L 5/08 192/217.4 |

* cited by examiner

HUB SYSTEM AND VEHICLE

PRIORITY APPLICATION

This application claims the benefit of priority under 35 U.S.C. 119 to Netherlands Application No. 2012240, filed on 11 Feb. 2014; which application is incorporated herein by reference in its entirety.

The invention relates to a hub system for a vehicle, such as a chain driven vehicle, for example a go-kart for a child.

Such hub systems, for instance conventional bike hub systems, are often provided with a coaster brake arrangement.

For example, hub systems with a coaster brake arrangement are known which comprise: a hub shaft; a driving member being rotatably mounted with respect to the hub shaft; a hub shell being rotatably mounted with respect to the hub shaft; a brake shoe arranged for engaging the hub shell such as to be coupled with said hub shell temporarily; a brake anchor arranged to be fixedly attached to a frame of a vehicle; and a coupling element arranged for enabling coupling between the driving member and the hub shell in a first position of said coupling element, and for enabling coupling between the brake anchor and the hub shell in a second position of the coupling element.

Such hub systems are known from practice. For example, pedal driven go-karts provided with such hub system provided with a coaster brake arrangement have been sold by the company Berg Toys.

The company Berg Toys sold for instance go-karts, wherein the brake anchor of the hub system is provided with a freewheel device. Said hub system is called a BFR hub system. It is noted that BFR stands for Brake, Forward and Reverse. Said BFR hub system allows a driver to drive forwards by pedalling forwards, to coast with the pedals remaining static when the vehicle is already rolling forwards, to brake by pedalling backwards slightly thereby activating an integrated coaster brake which comprises the brake shoe, and—due to the freewheel device—to drive backwards by pedalling further backwards after having braked.

Vehicles, such as go-karts, provided with said BFR hub system normally have a driving axis rotatably arranged in a vehicle frame, said driving axis normally being provided with pedals and a driving chain-wheel, which generally is coupled with a driven sprocket-wheel by means of a drive chain. Commonly, said driven chain-wheel is positioned around the hub shaft of the hub system, which hub shaft is fixed in rotational direction with respect to the vehicle frame, at a first lateral side of a hub shell of the system. At a second lateral side of the hub shell, the brake anchor is fixedly attached to the frame. Further, said driven sprocket-wheel is coupled to the driving member of the hub system, thereby enabling that rotational motion of the pedals and corresponding rotational motion of the driving member can make the hub shell to rotate forwards in order to drive forwards, can brake the hub shell, and can make the hub shell to rotate backwards subsequently in order to drive backwards. In order to pass the rotational motion of the hub shell, which hub shell is thus provided between the driven sprocket-wheel and the brake anchor, on to a wheel of the vehicle, a second driving chain-wheel is fixedly connected to said hub shell. By means of a second chain, said second driving chain-wheel is coupled with a second driven sprocket-wheel fixedly provided on a driven axis for driving at least one wheel, for example a left rear wheel, of the vehicle.

An advantage of a conventional BFR hub system over a normal coaster-brake hub system can lie in that such BFR hub system cannot only allow driving by pedalling forwards, coasting and braking, but can also allow a driver to drive rearwards after having braked.

However, disadvantages of a conventional BFR hub system may lie in that vehicles provided with such a hub system are normally of relatively complex design, e.g. due to the two separate drive chains. Further, the assembly and/or maintenance of the hub system and/or the vehicle, and/or (re-)adjustment of parts can be relatively difficult, time-consuming, error-prone and/or labour-intensive.

An object of the present invention is to provide an alternative hub system and/or an alternative vehicle, especially a go-kart and/or a chain driven or belt vehicle, preferably for a child. In particular, it is an object of the present invention to alleviate or solve at least one disadvantages of a conventional hub system, such as a BFR hub system, especially one of the disadvantages mentioned above. More in particular, the invention aims at providing a hub system, wherein at least one of the disadvantages of a conventional hub system is counteracted or advantages there above are obtained. Especially, the invention aims at providing a hub system which is arranged such that a vehicle provided with such hub system can be of relative simple design. In embodiments, the invention aims at providing a hub system which can enable that a vehicle provided therewith can allow driving forwards by pedalling forwards, can allow coasting, can allow braking, and can also allow driving rearwards after a user has braked, preferably without said vehicle having a relative complex design and/or without said vehicle being provided with two separate drive chains and/or an additional axis.

In a first aspect, the present invention provides for a hub system which comprises: a hub shaft; a driving member being rotatably mounted with respect to the hub shaft; a hub shell being rotatably mounted with respect to the hub shaft; a brake shoe arranged for engaging the hub shell such as to be coupled with said hub shell temporarily; a brake anchor arranged to be fixedly attached to a frame of a vehicle; and a coupling element arranged for enabling coupling between the driving member and the hub shell in a first position of said coupling element, and for enabling coupling between the brake anchor and the hub shell in a second position of the coupling element, wherein the hub shaft is rotationally coupled to the brake shoe in at least one rotational direction, and wherein the hub shaft is also rotationally coupled to the brake anchor in at least one rotational direction.

By rotationally coupling the hub shaft to the brake shoe in at least one rotational direction, and also rotationally coupling the hub shaft to the brake anchor in at least one rotational direction, the brake shoe and the brake anchor can be rotationally coupled to each other in at least one rotational direction via the hub shaft. Therefore, the hub system can enable that the brake shoe can be positioned at one lateral side of the driving member, and that that the brake anchor—coupled to said brake shoe by means of the hub shaft—can be positioned at the opposite lateral side of said driving member. As a result, the hub shell and/or a driven axis connected thereto can extend at a first lateral side of a sprocket-wheel attached to the driving member, whereas the brake anchor coupled to the hub shaft can be provided at the opposite lateral side of said sprocket-wheel. Hence, the rotational movement or stagnation of the hub shell can be passed onto a wheel attached to said hub shell and/or driven axis substantially directly, e.g. without needing a second driving chain-wheel, a second driven sprocket-wheel, and a second chain engaging with said sprocket-wheels.

In embodiments, a rotational coupling between the brake anchor and the brake shoe, e.g. via the hub shell and the hub shaft, can comprises a freewheel device, such as for instance a roller clutch or a rattle. As a result, after having braked, the then rotationally coupled driving member, brake shoe and hub shell may be allowed to rotate backwards with respect to the brake anchor. Hence, the hub system can go into reverse mode, such that the vehicle can be driven backwards.

Preferably, the freewheel device can be provided outside the hub shell. More preferably, said device can be provided between the brake anchor and the hub shaft. As a result, the diameter of the hub shell may for instance be limited to some extent. However, in alternative embodiments, the freewheel device may be located elsewhere, such as for instance between the brake shoe and the hub shaft.

Advantageously, the hub system may be arranged such that the freewheel device experiences a certain resistance when rotating in its freewheel direction due to friction between cooperating parts of said freewheel device, wherein a frictional force between said cooperating parts is larger than a frictional force between the coupling element and the driving member due to friction there between. As a result, it can be counteracted that the driving member is unintentionally coupled to the coupling element in rotational direction due to friction there between. Actually, it may be counteracted that the coupling element and therefore the hub shaft rotate backwards together with the backwardly rotating driving member, because a resistance force of the freewheel device can prevent this. It may thus be facilitated in a relatively elegant manner that the coupling element moves from its first position towards it second position when the driving member is rotated rearwards, in stead of that the hub shaft will freewheel, which usually may be highly unwanted. Hence, it can be facilitated in an elegant manner that a rearward movement of the driving member can cause the hub shell to brake and/or to rotate backwards in stead of that a rearward movement of the driving member only results in coasting or so-called freewheeling.

In embodiments, the hub system may comprise a resistance increasing element in order to enable that the frictional force between the cooperating parts of the freewheel device is larger than the frictional force due to the friction between the coupling element and the driving member. For example, said resistance increasing element may be a washer, such as a spring washer or lock washer, or any other suitable element, which may for instance be provided between two parts of the freewheel device which are moving with respect to each other during mutual rotation of said parts in a freewheeling direction of the freewheel device.

In embodiments said frictional force between cooperating parts as mentioned can be a static frictional force.

Advantageously, the hub shell can be attached to a driven axis for driving at least one wheel, or the hub shell can form a driven axis for driving at least one wheel. Hence, the driven axis of said wheel can be substantially in line with a central axis of the hub system. As a result, it can become superfluous to both mount a driven axis of the wheel to a vehicle frame and mount a parallel hub system to another part of the vehicle frame. Hence, a vehicle can be provided with a relatively simple frame.

The invention also relates to a vehicle, such as a chain driven vehicle or a belt driven vehicle, for example a go-kart for a child.

Advantageous embodiments of the invention are described below and in the appended claims.

By way of non-limiting examples only, embodiments of a prior art hub system and a prior art vehicle and embodiments of the present invention are now described with reference to the accompanying figures, in which.

The embodiments disclosed herein are shown as examples only and should by no means be understood as limiting the scope of the claimed invention in any way. In this description the same or similar elements have the same or similar reference signs.

Figure 1:
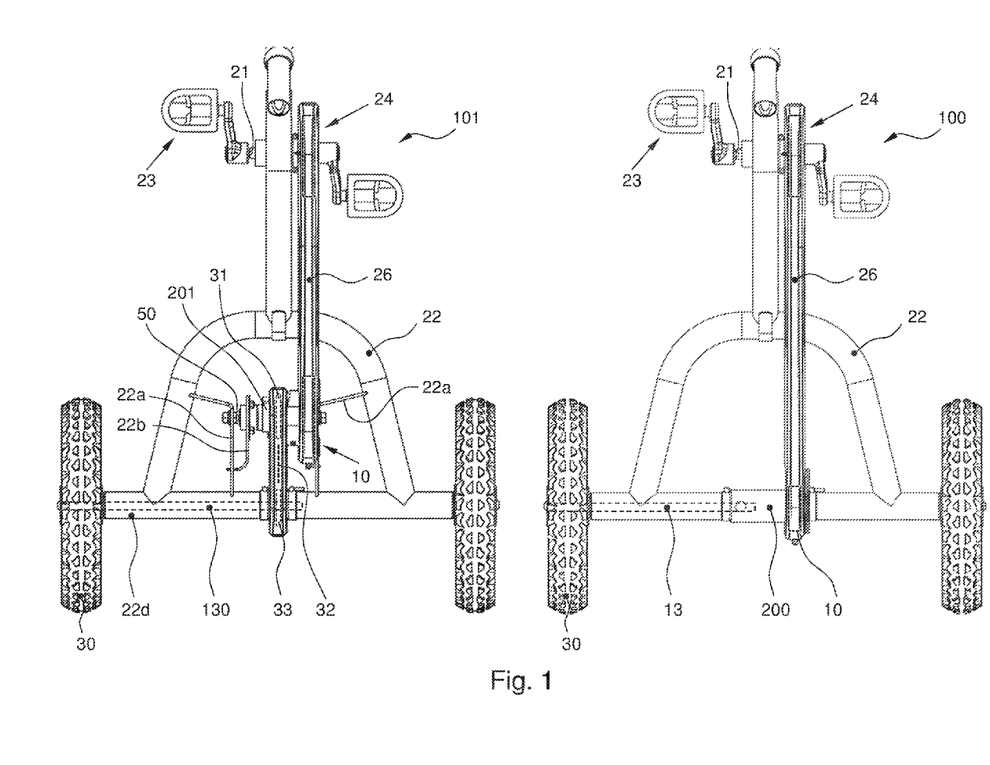
FIG. 1 shows a schematic top view of a part of a conventional vehicle and a part of a vehicle according to an aspect of the invention.

At its left side, FIG. 1 shows a schematic top view of a part of a conventional vehicle 101 according to the prior art. Further, at its right side, FIG. 1 shows a schematic top view of a part of an inventive vehicle 100 according to an aspect of the invention. For clarity sake, no steering wheels or handle bars, no front wheels, and no seats or saddles are shown in FIG. 1.

Figure 2:
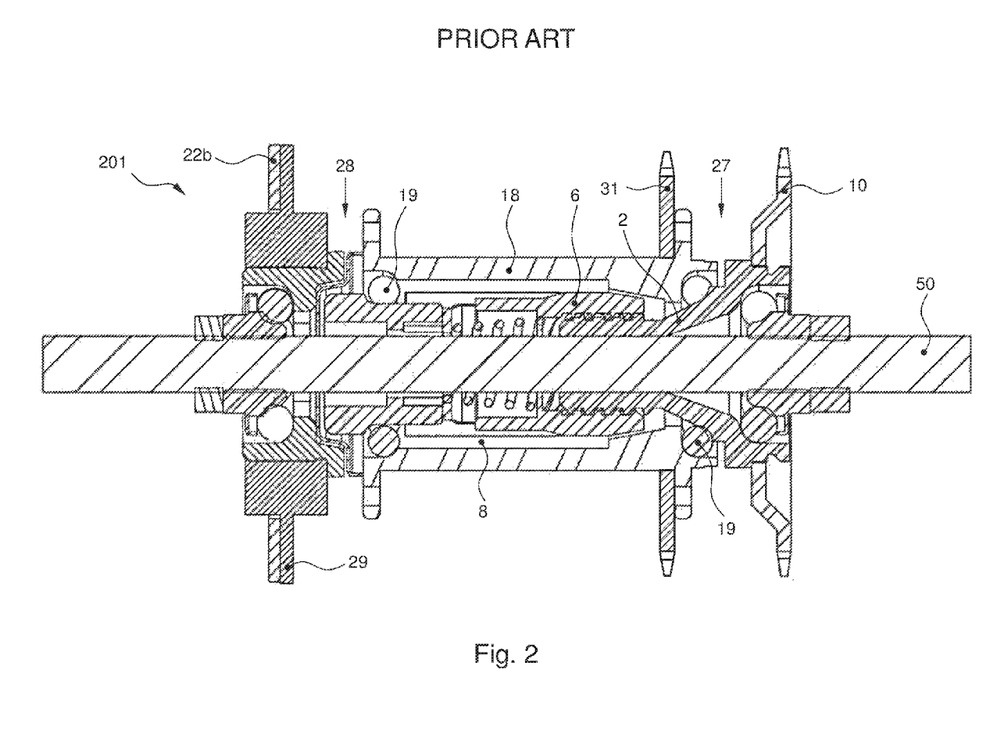
FIG. 2 shows a schematic cross-sectional view of a conventional hub system of the conventional vehicle shown in FIG. 1.

The prior art vehicle 101, shown at the left side of FIG. 1, is provided with a conventional hub system 201 according to the prior art, which can be better seen in FIG. 2. Here, the prior art vehicle 101 has a frame 22 and a driving axis 21 rotatably arranged in said vehicle frame 22. Said driving axis 21 is provided with pedals 23 and a driving chain-wheel 24. The driving chain-wheel 24 is coupled with a driven sprocket-wheel 10 by means of a drive chain 26. Said driven sprocket-wheel 10 is positioned around a hub shaft 50 of the hub system 201 at a first lateral side 27 of a hub shell 18. Said hub shaft 50 is fixed in rotational direction with respect to the vehicle frame 22, e.g. by mounting it to respective frame parts 22a. At a second lateral side 28 of the hub shell 18, a brake anchor 29 is fixedly attached to the frame 22 by means of a respective frame part 22b. Further, said driven sprocket-wheel 10 is coupled to a driving member 2 of the hub system 201. It is noted that the vehicle 101 and its hub system 201 are arranged such as to enable that rotational motion of the pedals 23 and corresponding rotational motion of the driving member 2 can make the hub shell 18 to rotate forwards in order to drive the vehicle 101 forwards, can brake the hub shell 18 in order to stop the vehicle 101, and can make the hub shell 18 to rotate backwards after braking in order to drive the vehicle 101 backwards. In order to pass the rotational motion of the hub shell 18, which hub shell is thus located between the driven sprocket-wheel 10 and the brake anchor 29, on to a wheel 30 of the vehicle 101, a second driving chain-wheel 31 is fixedly attached to said hub shell 18. By means of a second chain 32, said second driving chain-wheel 31 is coupled with a second driven sprocket-wheel 33 fixedly attached on a driven axis 130 for driving at least one wheel 30, for example a left rear wheel 30, of the vehicle 101. It is noted that said driven axis 130 can substantially extend through a respective part 22d of the frame 22.

Figure 3:
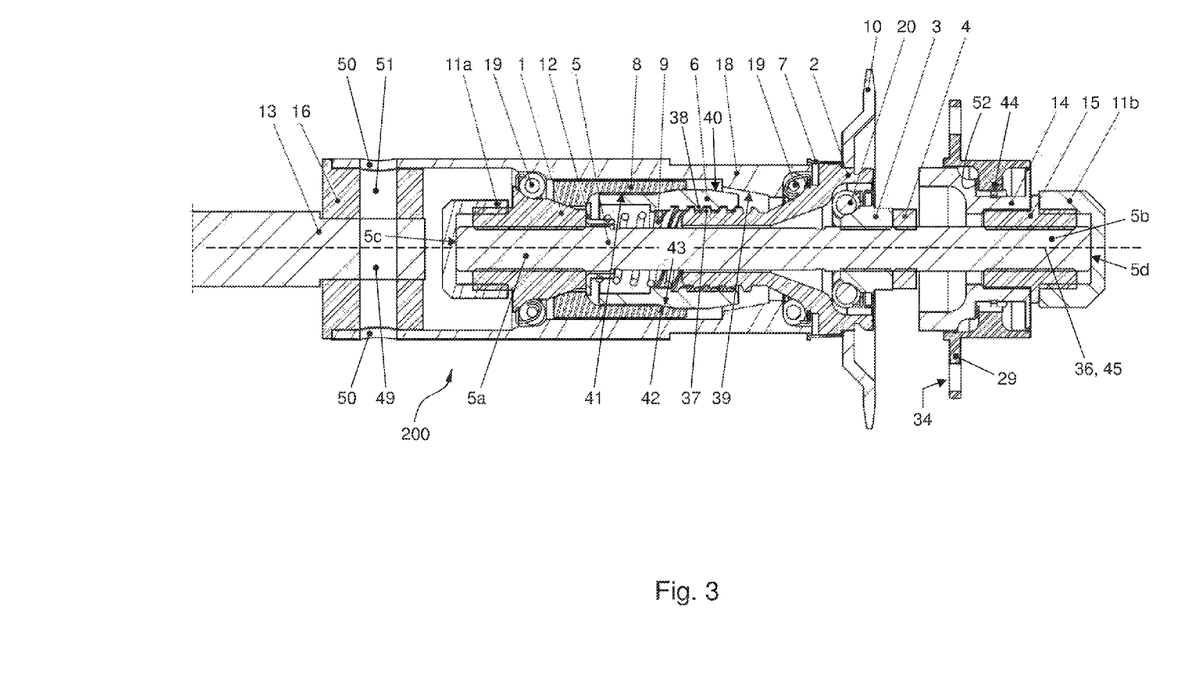
FIG. 3 shows a schematic cross-sectional view of an embodiment of an inventive hub system according to an aspect of the invention.
Figure 4:
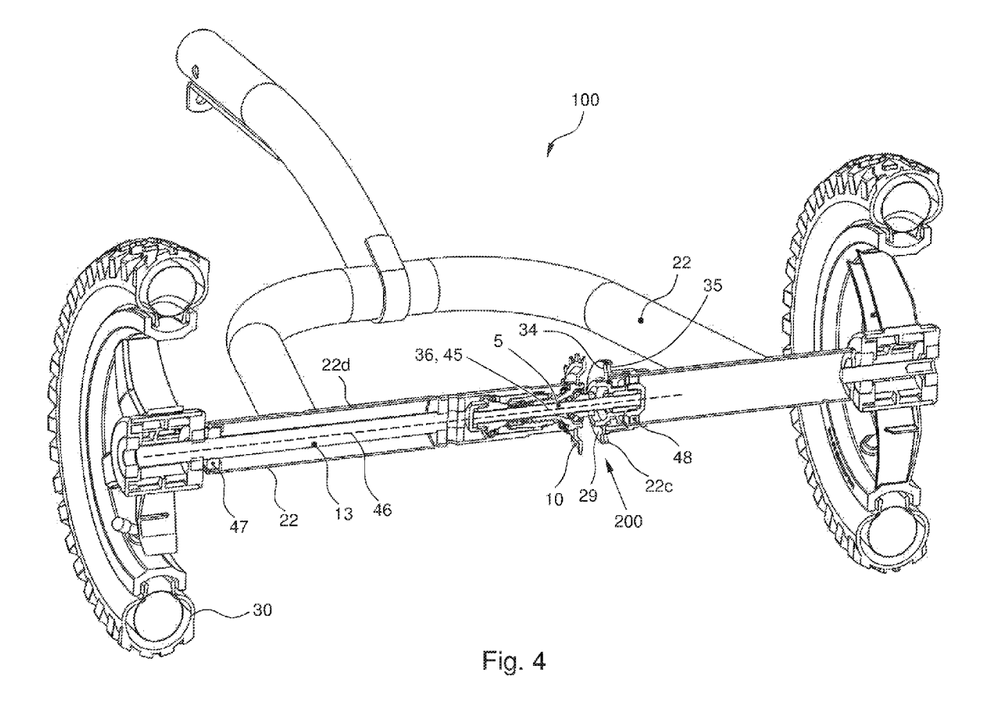
FIG. 4 shows a schematic, partly cut-away perspective view of the vehicle according to an aspect of the invention shown in FIG. 1 provided with the hub system shown in FIG. 3.

The inventive vehicle 100 according to an aspect of the invention, which is partly shown in FIG. 4 and at the right side of FIG. 1, comprises an inventive hub system 200 according to an aspect of the invention. A schematic cross section of said inventive hub system 200 is also shown in FIG. 3. Said hub system 200 is for a vehicle 100, for instance a pedal driven vehicle 100, a chain driven vehicle 100 and/or a go-kart, especially a vehicle for a child. The system 200 comprises a hub shaft 5, a driving member 2 being rotatably mounted with respect to the hub shaft 5, and a hub shell 18 being rotatably mounted with respect to the hub shaft 5, preferably at least partly by means of one or more bearings 19, especially bearings provided directly or indirectly between said hub shell 18 and the hub shaft 5 or the driving member 2. Further, the inventive hub system 200 comprises a brake shoe 8 arranged for engaging the hub shell 18 such as to be coupled with said hub shell 18 temporarily, at least in rotational direction. The hub system 200 also comprises a brake anchor 29 arranged to be fixedly attached to a frame 22 of a vehicle 100, at least in rotational direction. As can be seen in FIGS. 3 and 4, the brake anchor 29 may for instance comprise one or more openings 34 which can be placed adjacent to a respective corresponding opening 35 in a respective frame part 22c, through which an attachments means such as a bolt can be mounted. However, the brake anchor 29 may alternatively be arranged to be fixedly attached to the frame 22 by other means. Furthermore, the hub system 200 comprises a coupling element 6 arranged for enabling coupling between the driving member 2 and the hub shell 18 in a first position of said coupling element 6, and for enabling coupling between the brake anchor 29 and the hub shell 18 in a second position of the coupling element 6. Preferably, the coupling element 6 can be rotatably mounted with respect to the hub shaft 5, can be engaged with the driving member 2, e.g. by means of cooperating thread 37, 38, and can be movable in an axial direction or a so-called lateral direction parallel to a longitudinal direction of the hub shaft 5 between said first position and said second position. It is noted that the hub shaft 5 is rotationally coupled to the brake shoe 8 in at least one rotational direction, and that the hub shaft 5 is also rotationally coupled to the brake anchor 29 in at least one rotational direction, preferably the same rotational direction. Preferably, the hub shaft 5 can neither rotate forwards with respect to the brake shoe 8, nor forwards with respect to the brake anchor 29. For example, the brake shoe 8 can be attached to the hub shaft 5 at least partly by means of positive locking. Here, the brake shoe 8 is positively locked to a brake cone 1 provided between the hub shaft 5 and the brake shoe 8.

It is noted that the brake cone 1 can be substantially fixedly attached to the hub shaft 5. Here, the brake cone 1 is provided with inner thread and is screwed onto a first end portion 5a of the hub shaft 5 which is provided with outer thread. Here, an end cap 11 provided with inner tread is subsequently screwed onto outer thread of the brake cone 1. Said end cap 11 can counteract that the brake cone 1 can, during use of the hub system 200, move further laterally along the hub shaft 5 in the direction of a second end portion 5b of the hub shaft 5 opposite the first end portion 5a, e.g. due to that the end cap 11a can abut an end face 5c of the hub shaft 5.

In embodiments, the hub system 200 may further comprise a brake spring 9 arranged for biasing the coupling element 6 in a direction away from the brake shoe 8 and/or towards the first position of said coupling element 6.

Advantageously, the brake shoe 8 can be coupled with the hub shaft 5, e.g. rotationally coupled in at least one rotational direction, at a first location located at a first lateral side, e.g. the left side, of the driving member 2, and the brake anchor 29 can be coupled with the hub shaft 5, e.g. rotationally coupled in at least one rotational direction, at a second location, wherein the second location is located at a second lateral side of the driving member 2 and is located opposite of the first lateral side of said driving member 2, e.g. its right side.

In embodiments, the brake anchor 29 and the brake shoe 8 can be coupled to each other such that the coupling there between comprises a freewheel device 44, such as for instance a roller clutch or a rattle 14, 29. Preferably, said freewheel device 44 can be provided outside the hub shell 18, e.g. in order to save space in the hub shell 18. More preferably, the freewheel device 44 can be positioned between the brake anchor 29 and the hub shaft 5, such as is shown in FIG. 3. However, in alternative embodiments, the freewheel device 44 can have another location. For example, the freewheel device 44 can be provided between the brake shoe 8 and the hub shaft 5 and/or within the hub shell 18.

Advantageously, an inner portion 14 of the freewheel device can be substantially fixedly attached to the hub shaft 5, especially to its second end portion 5b. For example, the inner portion 14 can be screwed onto the hub shaft 5, preferably indirectly onto to the hub shaft 5 by screwing it onto a freewheel adapter element 15, which may be screwed onto the hub shaft 5. In embodiments, a second end cap 11b can be attached to the inner portion 14 of the freewheel device, thereby preventing that said inner portion 14 of the freewheel device can substantially move towards the hub shell 18 during use. In order to lock said inner portion 14 substantially with respect to the hub shaft 5, at least in one axial direction, e.g. at least in a direction towards the hub shell 18, the second end cap 11b can be screwed onto the freewheel adapter element 15. Since the end cap 11b can abut an end face 5d of the hub shaft 5, said end cap 11b can counteract that the inner portion 14 of the freewheel device can substantially move towards the hub shell 18 during use of the hub system 200. Further, it is noted that the inner portion 14 of the freewheel device can in alternative embodiments be attached to the hub shaft 5 in other manners. For example, the inner portion 14 may be attached to the shaft 5 by means of a bolt extending through said shaft 5 and said inner portion 14, the inner portion can be welded to the shaft 5, or the inner portion 14 can be integrally formed on the hub shaft 5. In yet a further alternative embodiment, the end cap 11b can be an integral part of the inner portion 14.

Advantageously, the hub system 200 may be arranged such that the freewheel device 44 can experiences a certain resistance when rotating in its freewheel direction due to friction between cooperating parts 14, 29 of said freewheel device 44, wherein a frictional force, such as a static frictional force, between said cooperating parts 14, 29 is larger than a frictional force, such as a static frictional force, between the coupling element 6 and the driving member 2 due to friction there between. As a result, it can be counteracted that the driving member 2 is unintentionally coupled to the coupling element 6 in rotational direction due to friction there between. Actually, it may be counteracted that the coupling element 2, and therefore also the hub shaft 5, rotates backwards together with the backwardly rotating driving member 2, because a resistance force of the freewheel device 44 can prevent this. It may thus be facilitated in a relatively elegant manner that the coupling element 6 moves from its first position towards it second position when the driving member 2 is rotated rearwards, in stead of that the hub shaft 5 will freewheel, which can be highly undesirable. Hence, it can thus be facilitated that a rearward movement of the driving member 2 causes the hub shell 5 to brake and/or to rotate backwards in stead of that a rearward movement of the driving member 2 only results in coasting or so-called freewheeling.

In embodiments, the hub system 200 may comprise a resistance increasing element 52 in order to enable that the frictional force, such as a static frictional force, between the cooperating parts 14, 29 of the freewheel device 44 is larger than the frictional force, such as a static frictional force, due to the friction between the coupling element 6 and the driving member 2. For example, said resistance increasing element 52 may be a washer 52, such as a spring washer or lock washer, or any other suitable element, which may for instance be provided between two parts 14, 29 of the freewheel device 44 which are moving with respect to each other during mutual rotation of said parts 14, 29 in a freewheeling direction of the freewheel device 44.

Additionally or alternatively, the hub system 200 may be arranged to limit frictional resistance between the coupling element 6 and the driving member 2. For example, the cooperating thread 37, 38 provided at these parts 2, 6 may be relatively smooth, e.g. by providing at least one of them with at least a relatively smooth outer layer, e.g. comprising Teflon. As another example, these parts 2, 6 may be relatively well lubricated.

It is noted that the hub system 200 can be provided in a vehicle 100, such as for instance a go-kart for a child, a pedal driven vehicle, such as a chain or belt driven vehicle. The hub system 200 can for instance be mounted in a frame 22 of the vehicle 100. As can be seen in FIG. 4, a central axis 45 of the hub shell 18 and/or a central axis 36 of the hub system 200 can be in line with a central axis 46 of a driven axis 13 for driving at least one wheel 30, for example a rear wheel, especially a left rear wheel, of the vehicle 100.

In embodiments, the vehicle 100 can also comprise a driving axis 21 rotatably arranged in said vehicle frame 22. Said driving axis 21 can for instance be provided with pedals 23 and/or a driving chain-wheel 24. For example, said driving chain-wheel 24 can be coupled with a driven sprocket-wheel 10 of the hub system 200, e.g. by means of a drive chain 26. Preferably, the driving member 2 is provided with said sprocket-wheel 10 for cooperation with a drive chain 26. Said sprocket-wheel 10 can be fixed rotationally, and preferably also laterally or so-called axially, with respect to said driving member 2.

Advantageously, the hub system 200 can be mounted to the frame 22 of the vehicle 100 at least partly by means of fixedly attaching its brake anchor 29 to the frame 22.

Additionally or alternatively, the hub system 200 can be at least partly supported on bearings 47, 48 by the frame 22. In embodiments, the hub shell 18 and/or the driven axis 13 can be provided with at least one bearing element 47, 48 for facilitating that the hub shell 18 and/or the driven axis 13 can be rotatably attached to the frame 22 of a vehicle 100. For example, bearings 47, e.g. one or more roller bearings 47, may be provided between the driven axis 13 and the frame 22. Alternatively or additionally, a bearing may be provided between the hub shell 18 and the frame. Additionally or alternatively, other parts of the hub system 200 can be supported on bearings. For example, the hub shaft 5, e.g. at an end protruding from the hub shell 18 at the side of the brake anchor 29, may be provided with a bearing element 48 for facilitating that the hub shaft 5 can be rotatably attached to the frame 22, and/or the hub shaft 5 may be supported on one or more bearings 48 by the frame 22. Although the latter bearing 48 is here provided indirectly on the hub shaft 5, said bearing may in alternative embodiment be placed directly onto said hub shaft 5.

The operation of a hub system 200 according to the invention will now be briefly described at the hand of FIG. 3. Here, the hub system 200 is shown seen from the rear side of the hub system 200, which can correspond with the rear side of the vehicle 100. In the here shown exemplary embodiment, the driven sprocket-wheel 10, which can be directly coupled to a driving chain-wheel 24 of a vehicle 100 by means of a drive chain 26, is positioned at the right side of the hub shell 18, and the brake anchor 29 is positioned at the right side of the driven sprocket-wheel 10. It is noted that, during use, the brake anchor 29 is fixedly attached to the frame 22. All the other parts of the hub system 200 may be mounted such as to be able to rotate around the central axis 36 of the hub system 200. It is further noted that, except for the coupling element 6, all hub system parts discussed above, may be prevented from moving laterally, e.g. axially, during use of the hub system 200. When the driving member 2 is rotated forwards, e.g. by means of pedalling forwards, said driving member 2 moves the coupling element 6 to the first position in which said element 6 enables coupling, especially rotational coupling in at least one direction, between the driving member 2 and the hub shell 18. For example the driving member 2, which may be substantially cone-shaped and which can be a so-called driving cone 2, may be provided with outer thread 37 engaging with inner thread 38 of the coupling element 6, such that said driving member 2 can enable that the coupling element 6 moves laterally or axially with respect to the hub shaft 5. Here, when the driving member 2 is rotated forwards, the coupling element 6 can move to the right. In embodiments, the coupling element 6 can move with a conical gripping surface 40 towards a corresponding conical gripping surface 39 of the hub shell 18. As soon as the gripping surfaces 39, 40 engage, the coupling element 6 will not substantially move laterally any further, but will rotate forwards together with the driving member 2, thereby driving the engaged hub shell 18 forwards as well. Although the coupling element 6 and the hub shell 18 are here provided with said gripping surfaces 39, 40, it is noted that the hub system 200 may in alternative embodiments be arranged alternatively in order to allow that the coupling element 6 can engage with the hub shell 18 in the first position in such a way that they 6, 18 are then coupled in at least one rotational direction, e.g. in such direction that the hub shell 18 rotates forwards when the coupling element 6 rotates forwards.

Moreover, it is noted that the hub shell 18 can be attached to a driven axis 13 for driving at least one wheel 30. Alternatively, the hub shell 18 itself may form a driven axis 13 for driving said at least one wheel 30. Here, the hub shell 18 is rotationally coupled to the driven axis 13, in both rotational directions, by fixedly attaching them to each other. This can for instance be done by means of a bolt extending through corresponding holes 49, 50 in the driven axis 13 and hub shell 18. In the embodiment shown, an adapter 16, which can comprise a corresponding bore hole 51, is positioned between the axis 13 and hub shell 18, such that an axis 13 can be used which has a relatively small outer diameter with respect to an inner diameter of the hub shell 18.

Furthermore, it is noted that the driven wheel 30 of the vehicle 100 can be rotationally coupled to the driven axis 13. Hence, a rotational movement of the hub shell 18 can be passed on to said wheel 30. Forward rotation of the hub shell 18 due to forward pedalling will thus result into forward rotation of the wheel 30. Preferably, only one wheel 30 is driven by the driven axis 13, thereby counteracting that the vehicle cannot be steered through a turn.

In embodiments, a freewheel device, such as for instance a rattle or roller clutch, can be provided between the coupling element 6 and the hub shell 18, e.g. provided between their gripping surfaces 39, 40 and/or formed at least partly by said gripping surfaces 39, 40. As a result, the hub system 200 may allow a user to coast with the vehicle 100. This is, the hub shell 18 can then keep rotating forwards, when the vehicle is rolling forwards and the pedals 23 and the driving member 2 coupled therewith are for instance held stationary with respect to the frame 22.

Further, the hub system 200 can be used to break. Thereto, when the driving member 2 is rotated backwards, e.g. by pedalling backwards, the coupling element 6 can be moved to a second position. Preferably, said second position can be axially offset from the first position. For example, the coupling element 6 can be moved laterally or so-called axially with respect to the hub shaft 5, e.g. to the left, in order to be moved to said second position. In said second position, the coupling element 6 can enable coupling between the brake anchor 29 and the hub shell 18. Advantageously, said coupling can for instance be enabled by pushing the coupling element 6 at least partly beneath a portion of the brake shoe 8 such that the brake shoe 8, which may be resilient to some extent, bends towards an inner surface 41 of the hub shell 18. Hence, the brake shoe 8 can grip the hub shell 18, e.g. at least partly by means of friction, and can stop said hub shell from substantially rotating with respect to the brake shoe 8, which brake shoe 8 can be kept from moving with respect to the coupling element 6 by means of cooperating gripping surfaces 42, 43 thereof. Although the coupling element 6 and the brake shoe 8 are here provided with said gripping surfaces 42, 43, it is noted that the hub system 200 may in alternative embodiments be arranged alternatively in order to allow that the coupling element 6 can cooperate with the brake shoe 8 in the second position such that said brake shoe 8 can then be coupled with the hub shell 18. It is noted that by stopping the hub shell 18 from moving forwards in this manner, the hub shell 18 becomes rotationally coupled, in the backward direction, with the driving member 2. Here, the hub shell 18 is for instance rotationally coupled to the driving member 2 in said backward direction by means of the coupling element 6 and the brake shoe 8. Since the hub shaft 5 is rotationally coupled to the brake shoe 8, in at least one rotational direction, especially the backward direction, and preferably in both rotational directions, the hub shaft 5 will here be rotated backwards when the driving member 2 is rotated backwards after a user has braked the forward rotation of the hub shell 18. It is noted that the hub shaft 5 is here coupled to the brake anchor 29 by means of freewheel device 44 which allows said hub shaft 5 to rotate backwards with respect to said brake anchor 29. As a result, by pedalling backwards after having braked, a user can make the hub shell 18 to rotate backwards. This can thus result in that the driven axis 13 attached to the hub shell 18, and the wheel 30 attached to the driven axis 13 will rotate backwards as well, thereby driving the vehicle 100 backwards.

The invention is not in any way limited to the exemplary embodiments presented in the description and drawings. All combinations (of parts) of the embodiments shown and described are explicitly understood to fall within the scope of the invention. Moreover, it will be understood that many variations are possible within the scope of the invention as formulated in the appended claims.

For example, the vehicle 100 may be arranged such that another wheel of said vehicle is driven, for example its right rear wheel.

As a further example, in embodiments, the drive chain 26 can for instance be replaced by another transmission element for transmitting power from the driving axis 21 to the driving member 2. For example, a drive belt may be provided, such as a teethed drive belt, and the chain-wheel and the sprocket-wheel may be replaced by corresponding pulleys or cog-wheels. As another example, the driving member 2 may be provided with a first gear wheel forming a connection element for cooperation with a second gear wheel forming a transmission element, e.g. for transmitting a movement of a driving axis 21 to said driving member 2, substantially directly or indirectly.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A hub system for a vehicle, comprising:
   a hub shaft;
   a driving member being rotatably mounted with respect to the hub shaft;
   a hub shell being rotatably mounted with respect to the hub shaft;
   a brake shoe arranged for engaging the hub shell such as to be coupled with said hub shell temporarily;
   a brake anchor arranged to be fixedly attached to a frame of the vehicle; and
   a coupling element arranged for enabling coupling between the driving member and the hub shell in a first position of said coupling element, and for enabling coupling between the brake anchor and the hub shell in a second position of the coupling element, wherein the hub shaft is rotationally coupled to the brake shoe in at least one rotational direction at a first location located at a first lateral side of the driving member, wherein the hub shaft is rotationally coupled to the brake anchor in at least one rotational direction at a second location located at a second lateral side of the driving member and opposite of the first lateral side of said driving member, wherein a rotational coupling between the brake anchor and the brake shoe comprises a freewheel device, and wherein the freewheel device is provided outside the hub shell.

2. The hub system according to claim 1, wherein the freewheel device comprises a roller clutch or a rattle.

3. The hub system according to claim 1, wherein the freewheel device is provided between the brake anchor and the hub shaft.

4. The hub system according to claim 1, wherein said hub system is arranged such that the freewheel device experiences a certain resistance when the hub shaft rotates in its freewheel direction due to friction between cooperating parts of said freewheel device, wherein a frictional force between said cooperating parts is larger than a frictional force between the coupling element and the driving member due to friction there between.

5. The hub system according to claim 4, further comprising a resistance increasing element.

6. The hub system according to claim 1, wherein the hub shell is attached to a driven axis for driving at least one wheel or wherein the hub shell forms a driven axis for driving at least one wheel.

7. The hub system (200) according to claim 1, wherein at least one of the hub shell and the driven axis is provided with a bearing element for facilitating that at least one of the hub shell and the driven axis can be rotatably attached to a frame of the vehicle.

8. The hub system according to claim 1, wherein the hub shaft is provided with a bearing element for facilitating that the hub shaft can be rotatably attached to a frame of the vehicle.

9. The hub system according to claim 1, wherein the coupling element is rotatably mounted with respect to the hub shaft, is engaged with the driving member, and is movable in an axial or so-called lateral direction parallel to a longitudinal direction of the hub shaft between the first position and the second position.

10. The hub system (200) according to claim 1, wherein the hub system is arranged such that the coupling element engages with the hub shell in the first position such that they are then coupled in at least one rotational direction.

11. The hub system according to claim 1, wherein the hub system is arranged such that the coupling element cooperates with the brake shoe in the second position such that the brake shoe is then coupled with the hub shell.

12. The hub system according to claim 1, wherein the driving member is provided with a connection element, wherein said connection element is arranged for cooperation with a transmission element for transmitting a movement of a driving axis to said driving member.

13. A vehicle, comprising a hub system according to claim 1.

14. The vehicle according to claim 13, wherein a central axis of the hub shell is in line with a central axis of a driven axis for driving at least one wheel of the vehicle.

15. The vehicle according to claim 13, wherein at least one of the hub shell, the driven axis, and the hub shaft is supported on bearings by a frame of said vehicle.

16. The vehicle according to claim 13, wherein said vehicle is a chain or belt driven vehicle.

17. The hub system according to claim 1, wherein the vehicle is a chain or belt driven vehicle.

18. A hub system for a vehicle, comprising:
a hub shaft;
a driving member being rotatably mounted with respect to the hub shaft;
a hub shell being rotatably mounted with respect to the hub shaft;
a brake shoe arranged for engaging the hub shell such as to be coupled with said hub shell temporarily;
a brake anchor arranged to be fixedly attached to a frame of the vehicle; and
a coupling element arranged for enabling coupling between the driving member and the hub shell in a first position of said coupling element, and for enabling coupling between the brake anchor and the hub shell in a second position of the coupling element,
wherein the hub shaft is rotationally coupled to the brake shoe in at least one rotational direction at a first location located at a first lateral side of the driving member, wherein the hub shaft is rotationally coupled to the brake anchor in at least one rotational direction at a second location located at a second lateral side of the driving member and opposite of the first lateral side of said driving member, wherein a rotational coupling between the brake anchor and the brake shoe comprises a freewheel device, wherein the hub system comprises a resistance increasing element and is arranged such that the freewheel device experiences a certain resistance when the hub shaft rotates in its freewheel direction due to friction between cooperating parts of said freewheel device; wherein a frictional force between said cooperating parts is larger than a frictional force between the coupling element and the driving member due to friction there between.

19. The hub system according to claim 18, wherein the resistance increasing element is a washer.

20. The hub system according to claim 18, wherein the resistance increasing element is provided at least partly between the cooperating parts of the freewheel device.

* * * * *

UNITED STATES PATENT AND TRADEMARK OFFICE
CERTIFICATE OF CORRECTION

PATENT NO. : 9,610,805 B2
APPLICATION NO. : 14/615980
DATED : April 4, 2017
INVENTOR(S) : van den Berg et al.

Page 1 of 1

It is certified that error appears in the above-identified patent and that said Letters Patent is hereby corrected as shown below:

In the Claims

In Column 11, Line 28, in Claim 11, delete "huh" and insert --hub-- therefor

In Column 12, Line 34, in Claim 18, delete "device;" and insert --device,-- therefor Signed and Sealed this
Tenth Day of July, 2018

Andrei Iancu
*Director of the United States Patent and Trademark Office*